United States Patent [19]
Winner

[11] Patent Number: 6,108,084
[45] Date of Patent: Aug. 22, 2000

[54] COMBINED SENSOR DEVICE FOR MEASURING BOTH RAIN-COVERED AREA ON AND VISUAL RANGE THROUGH A WINDSHIELD OF A MOTOR VEHICLE

[75] Inventor: Hermann Winner, Karlsruhe, Germany

[73] Assignee: Robert Bosch GmbH, Stuttgart, Germany

[21] Appl. No.: 08/813,378

[22] Filed: Mar. 6, 1997

[30] Foreign Application Priority Data

Aug. 17, 1995 [DE] Germany ............. 195 30 289
Jul. 24, 1996 [WO] WIPO ............. PCT/DE96/01353

[51] Int. Cl.⁷ ................................. G01B 21/00
[52] U.S. Cl. ..................... 356/338; 356/342
[58] Field of Search ............... 356/338, 339, 356/341, 342, 73, 343

[56] References Cited

U.S. PATENT DOCUMENTS

| | | | |
|---|---|---|---|
| 4,459,024 | 7/1984 | Gerhely | 356/338 |
| 4,874,242 | 10/1989 | Bezard et al. | 356/343 |
| 5,451,931 | 9/1995 | Muller et al. | 356/338 |
| 5,504,577 | 4/1996 | Lonnquist et al. | 356/342 |

FOREIGN PATENT DOCUMENTS

WO94/15819  7/1994  Germany.

*Primary Examiner*—Robert Kim
*Attorney, Agent, or Firm*—Michael J. Striker

[57] ABSTRACT

A sensor is described which simultaneously allows visual range and rain-covered area detection. To this end, light is coupled into the windshield in such a way, that a portion is reflected in the windshield and a portion leaves the windshield and is scattered outside the windshield. The rain-covered area is determined from the reflected portion, and the usual range is determined from the scattered portion which returns to the windshield, wherein both portions are detected by means of a decoupling mechanism and a light receiver.

7 Claims, 3 Drawing Sheets

COMBINED SENSOR DEVICE FOR MEASURING BOTH RAIN-COVERED AREA ON AND VISUAL RANGE THROUGH A WINDSHIELD OF A MOTOR VEHICLE

BACKGROUND OF THE INVENTION

The present invention relates to sensors for visual range and rain-covered area detection, particularly for use in a motor vehicle.

Three principles distinguish the measuring of visual range: contrast, absorption and reflection measurements. The first principle requires an object in front of a black background which is marked by defined brightness. If this object can still be distinguished by the human eye, it is within visual range. This principle can be automated with the aid of photo and video technology, except for mobile use, since no suitable object for contrast can be guaranteed. The second principle is used at highway measuring points. Here a light beam which is sent from one side (generally with invisible infrared light) is received by the opposite side approximately 2 m away. In fog the light reception power drops. The drop then becomes a measure for the visual range. For self-sufficient detection in a moving motor vehicle this principle too is practically useless. In this case, the reflection principle could be applied, which is however much weaker. It is based on the back scatter of emitted light from fog drops. In fog this effect leads also to the well-known blinding effects created by the high beams. Reflection measurement is however sufficient for at least a rough classification of visual range. Principally a simple measuring arrangement that works like a reflecting light barrier is sufficient for the measurement. Although the results can be very easily interfered with and depend upon many parameters.

A marked improvement of robustness can be achieved via a locally dissolving back scatter measurement, in which the distance-dependent back scatter distribution can be utilized for visual range detection. Such a measuring procedure is the measuring of back scatter in several distance cells. These become distinguishable through correlation technologies. This measuring procedure corresponds to the common LIDAR (Light Detecting and Ranging) sensors, which are designated as distance sensors for distance warning and ACC. LIDAR sensors lend themselves well visual range detection. But particularly the back scatter under fog conditions leads to the biggest disadvantage of these sensors, in that the detection range is severely reduced.

An alternative procedure for determining the distance is the triangulation technology by which the transmitter and/or receiver is separated by a so-called base width. The strongly pointed transmitter and receiver lobes overlap with each other in a defined area, so that the reflection can only be detected from this area. Several transmitter and receiver lobes thus allow inclusion of several back scatter areas.

A particular difficulty with simple visual range detection is that it is hard to distinguish whether good visual range exists or whether important sensor components failed. Indirect testing can be done by testing the transmitter or receiver by means of comparing one or several reference light channels, which allows detection of a large part of possible defects.

Currently the most promising procedure for rain-covered area detection is based on decoupling a light beam from a light channel, which is limited by the edge surface of the windshield. These edge surfaces reflect the light channeled in by means of a prism, since the light beam angle is too small to allow for transmission. If a rain drop now moistens the light channel, the condition for reflection (windshield—air) then ceases, but instead a large part of the light is emitted from this drop. The decreasing light capacity of the channel is measured at the decoupling point (again prism or similar) by means of photo diodes or photo transistors. For synchronized light and noise suppression the transmission power is generally modulated and the receiver signal is measured in a phase sensitive manner.

SUMMARY OF THE INVENTION

It is an object of the present invention to counter excessive speed during unfavorable visual conditions, or the use of automatic distance-regulating speed controls (Adaptive Cruise Control/ACC) for "blind flight", and to inform the driver of excessive speed during unfavorable visual conditions. The object of a visual range sensor is to provide such information, which also can be fed to the ACC system.

According to the invention, the sensor device for visual range determination and rain-covered area measurement of a rain-covered area on a windshield of a motor vehicle is in the motor vehicle and comprises a light source; coupling means for coupling light from the light source at predetermined angles to the windshield into the windshield of the motor vehicle, so that one light portion is reflected within the windshield and another light portion is back scattered to the windshield from reflecting sources located outside the motor vehicle; decoupling means for decoupling the one light portion reflected within the windshield from the other light portion and a light receiver for receiving, after the decoupling, both the one light portion reflected within the windshield and the other light portion back scattered from the reflecting sources. The light receiver comprises means for evaluating both light portions to determine the rain-covered area on the windshield and the visual range through the windshield.

The sensor device in accordance with the invention has the advantage of a functional combination and spatial integration of a rain-covered area and visual range sensor. A separation is made possible by means of separation or running time differences. Checking for defects in the rain-covered area sensor makes it possible to detect defects in the visual range detection. The visual range detection is possible by means of one value or several back scatter values with different distances. A cost-effective use of components for different objectives (rain-covered area and visual range scanning) is of particular advantage. Two functions at one location are obtained by means of integration. When measuring a visual range, a defect detection is possible by means of the reference channel that scans the rain-covered area.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE PREFERRED EMBODIMENTS

Figure 1:
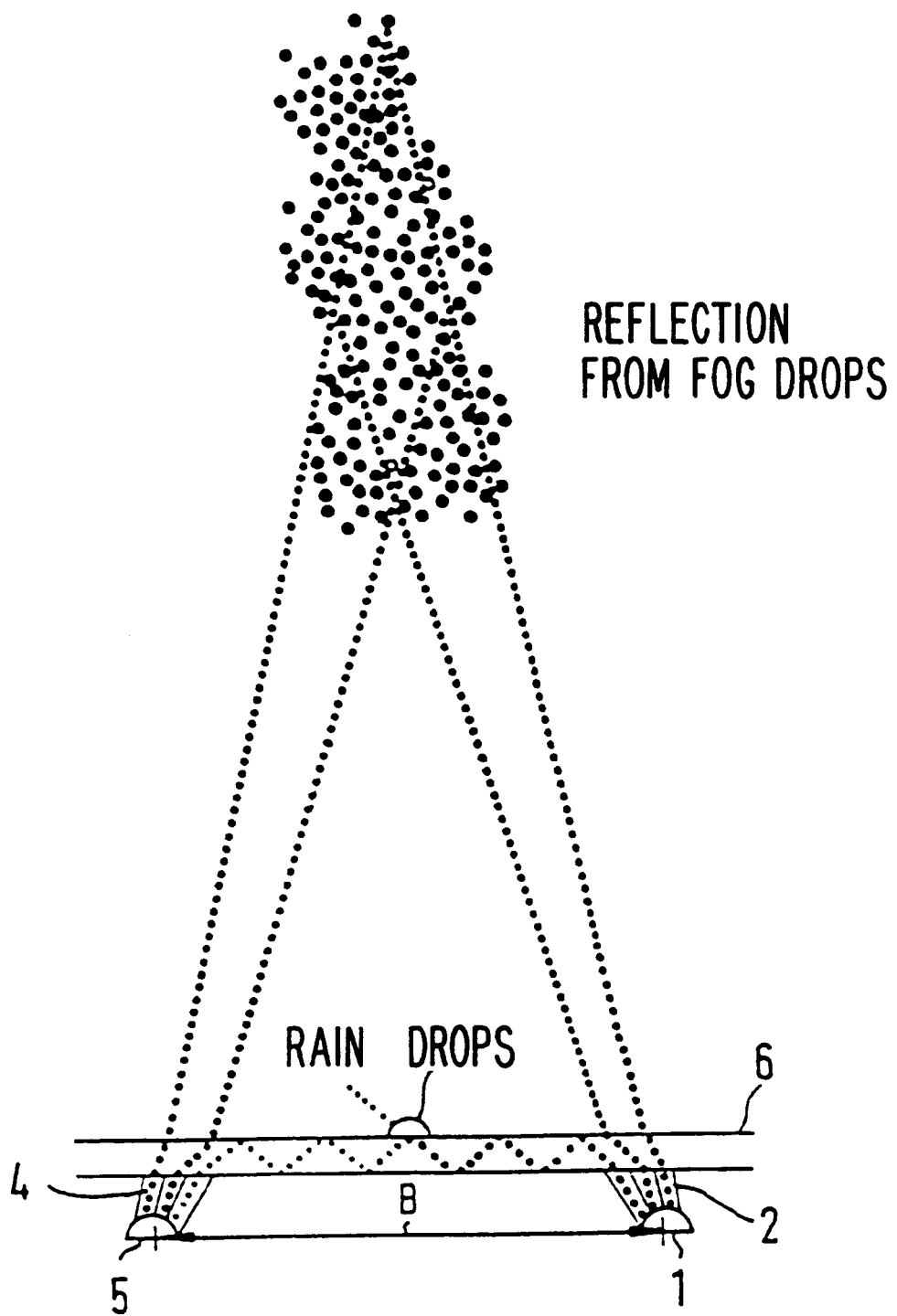
FIG. 1 is a diagrammatic view of a sensor according to the invention installed in a motor vehicle which illustrates the basic principle of the invention.

In this invention the novelty lies in that the functions of visual range detection and the measuring of the rain-covered area are combined in one unit. A possible embodiment is shown in FIG. 1. In these embodiment light from the light source 1, for example an LED or HL laser, is coupled under several angles into the windshield 6 by means of a coupling medium, for example a type of prism. That portion of the light beam with the deepest inclination stays in the windshield and is used for measuring the rain-covered area. The propegation of these beams occurs in a zigzag-like manner at least as long as no rain-covered area leads to de-coupling. The multiple reflections of the beams at the windshield boundaries are fed by means of a decoupling medium 4 to a light receiver 5, for example a photo diode, which converts the light output into an electrical signal. The distance between the coupling medium 2 and the decoupling medium 4 is the base width B.

The last described partial function corresponds to the conventional way of measuring a rain-covered area. For visual range scanning, parts of the beam are used that are also decoupling in an area of the windshield free of rain. In fog or spray these beams are diffusely reflected (scattered). Part of the scattered light also reaches the light receiver. Without further measures this portion is not separable from the light which was conducted within the windshield. Two basic ways are available in order to achieve the separation:

1. Optical separation of both beams,
2. Modulation of the light source and separation of the light beams by means of different transit times.

1. Optical Separation between Interior Windshield Beam and Scattered Light.

Figure 3:
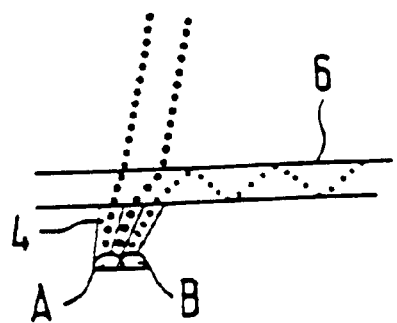
FIG. 3 is a diagrammatic view of an additional embodiment of a sensor according to the invention similar to that shown in FIG. 1 but having optical separation of the receiver channels.
Figure 4:
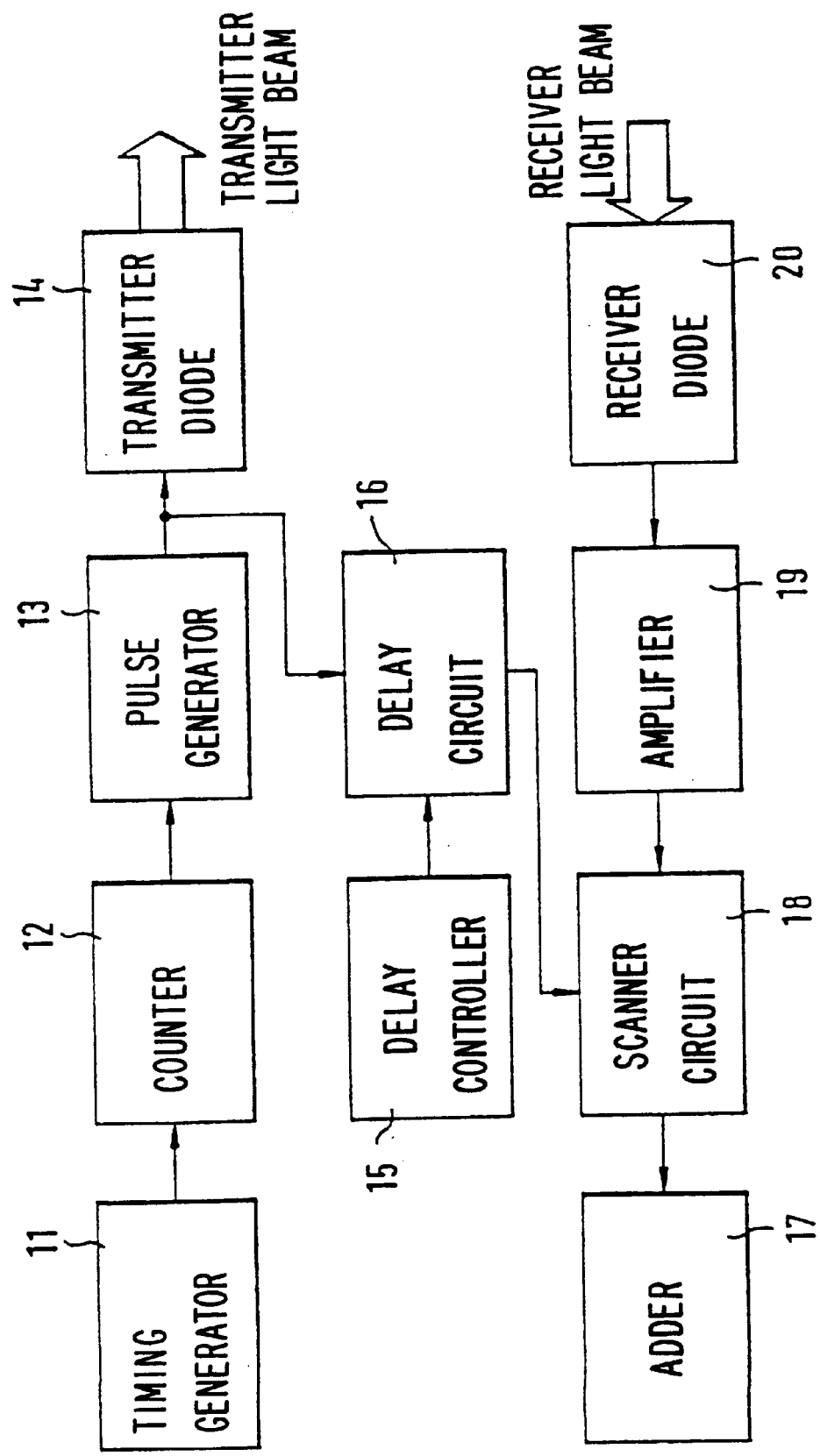
FIG. 4 is a block diagram of a transmitter and receiver device for use with the sensor according to the invention.

As shown in FIG. 3, the separation can be provided by means of a double receiver instead of a simple light receiver. Light receiver A mainly measures the back scattered beam, receiver B the interior beam of the windshield. Basis for this is a clear separation before and during decoupling, so that no undefined overlaid coupling between both beams can take place.

This principle can further be expanded, in that the back-scattered light beams are separated in accordance with their back-scattered angle by means of additional light receivers. By means of the varied angle it is possible to make a statement regarding the distance of the back-scatter per triangulation (with the aid of base width B and knowledge of the transmitter beam angle), so that more reliable statements about the visual range are possible.

2. Light Source Modulation

A very simple type of modulation is pulse modulation with a short pulse. To this end, a pulse generator 13 is periodically controlled by a counter 12 which in turn is provided with the time cycle of the timing generator 11. The pulse generator generates an electrical pulse which is transformed into a light pulse by the transmitter diode 14. The pulse length $\Delta\tau$ should be smaller or the same size as the transit or travel time $\tau$ of the back scatter of the beams. At a distance d=10 m of back scatter, the transit or travel time $\tau$ for both directions equals approximately 66 ns ($\tau$=2d/c) (comparison: the transit or travel time inside the windshield only equals approximately one hundredth of that). The receiver diode 20 transforms the light received into an electrical signal, which is amplified by the amplifier 19 and is forwarded to the scanner circuit 18. The moment of scanning itself is determined by the transmitter pulse. To this end, the signal of the pulse generator is fed into a delaying circuit 16 where it is delayed for a time period set by a delaying control 15. In the summer 17 the scanned signal is added to the signals of prior pulses. The result corresponds in mathematical terms to a signal correlation K(T) of a defined delay period (T) of the transmitter pulse with received signal.

The light output K(T1), correlated with a minor delay (T1) corresponds to the light beam conducted in the windshield, while K(T2), correlated with the somewhat longer delay time (T2), can be associated with the back-scattered portion of the beam. The correlation delay times are clearly dependent upon the pulse duration $\Delta$ t and $\tau$: T1 $\Delta\approx$t/2, T2 $\Delta\approx$t+$\tau$/2. Measurements with further correlation delay times can also be utilized here for measuring distance determined by back scatter. Other possible types of modulation are continuous wave amplitude modulation of the light source with high frequency modulation frequency on the order of 1 MHz, as well as pseudo random binary modulation, which can be understood as a variation of the single pulse modulation described above.

Signal Evaluation

After separation of the signals $T(t_i)$, of the received output controlled by the beam within the windshield, and $R(d_j, t_i)$, the received output of the beam scattered back from the distance $d_j$ (all measured at set time $t_i$), the following information is gained or actions are undertaken. If $T(t_i)$ falls below a threshold value, the windshield wiper is triggered. In the process it is expected, that T rises at least briefly above the threshold, namely just when the wiper drives passes over the sensor area. If this, even after several wiping movements, fails to occur, a defect must be assumed to exist in the link (electrical triggering of the light source, the light source itself, coupling, decoupling, light receiver, electrical signal processing) and thus leads to the setting of an error flag. Exceeding the threshold value on the other hand always leads to setting the flag back.

Evaluation of the back scatter differs if only one value exists or if several values at different back scatter distances exist:

a) Only One Value

The back scatter value is compared with stored values and undergoes classification. Determination of the class is based upon comparison measurements in real fog, in which a reference measurement (for example absorption or contrast measurement) determines the visual range. Influences because of changing light source intensities and transmitter sensitivities can at least partially be compensated by comparing the measurements of the controlled beam in the windshield. After classification, in particular when classifying the highest visual range, tests are made to determine whether the above mentioned error flag has been set into place. If this was not so, fully efficient working order can be assumed and the absence of a back scatter signal can be interpreted as truly high visibility. Without testing by means of the beam conducted in the windshield, a defect in the light source for instance would not be distinguishable from the correct measurement at high visibility.

b) Several Values at Different Distances

The back scatter from water drops has a characteristic dependence on distance. This is described in Jürgen Streicher, "Forschungsbericht DLR-FB 90-50, Simulation eines Rüickstreustrom-Lidar" 1990 [Research Report DLR- FB 90-50, Simulation of a Reflected Return Current-Lidar]. If there is information of the reflection from different distances, not only the output, but also the relationship between the varying back scatter values can be evaluated. Errors that have an influence on the reflection output (for example reduced light source power or receiver sensitivity, but also reduced windshield transmissibility) can be eliminated in the same way as back-scatter from other reflecting sources (for example other vehicles in the immediate vicinity). Similar to evaluation with only one value, here too a comparison with reference values can lead to a classification of the visual range, in which the above-mentioned error flag can be used for for defect identification.

Possible Expansions

Figure 2B:
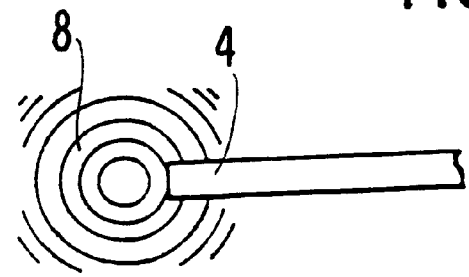
FIGS. 2a and 2b are a diagrammatic view of another embodiment of a sensor according to the invention similar to that shown in FIG. 1 but having an additional Fresnel lens.
Figure 2A:
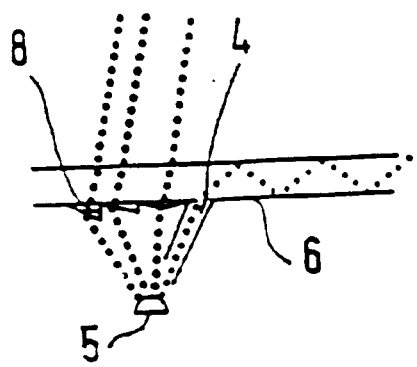

The embodiments shown in FIGS. 1 and 3 have the disadvantage of a very reduced receiving area which is determined by the receiver. In order to increase the sensitivity, focusing is desirable, so that a larger receiving area can be made available. One possible embodiment is shown in FIGS. 2a, 2b which, based on an arrangement as shown in FIG. 1, has an additional collector lens 8 (in this case a Fresnel lens of particular flat construction). The light receiver now is located in the focus of this lens somewhat further away from the windshield. An important requirement for the Fresnel lens is that it not interfere with the decoupling of the light beam fed to the windshield; no light should be decoupled by the Fresnel lens. For this reason no lens should be arranged directly at the windshield boundary of the rain-covered area detection area.

I claim:

1. A sensor device in a motor vehicle for visual range determination and rain-covered area measurement of a rain-covered area on a windshield of the motor vehicle, said sensor comprising a light source;

coupling means for coupling light from the light source propagated at predetermined angles to the windshield into the windshield of the motor vehicle, so that one portion of said light is reflected within the windshield and another portion of said light is back scattered to the windshield from reflecting sources located outside the motor vehicle;

decoupling means for decoupling said one light portion reflected within the windshield from said another light portion; and a light receiver for receiving, after said decoupling, both said one light portion reflected within the windshield and said another light portion back scattered from the reflecting sources, said light receiver including means for evaluating said one light portion and said another light portion to determine the rain-covered area on the windshield and to determine the visual range in front of the windshield means for modulating the light produced by the light source.

2. The sensor device as defined in claim 1, wherein said coupling means comprises a prism.

3. The sensor device as defined in claim 1, further comprising means for separating said light portions from the decoupling means into a scattered light portion and a reflected light portion.

4. The sensor device as defined in claim 3, further comprising means for focusing the scattered light portion and the reflected light portion on the light receiver to increase sensitivity.

5. The sensor device as defined in claim 1, wherein said means for modulating is a pulse modulating device producing a light pulse having a duration which is less than a transit time between generation of said light and reception of said light.

6. The sensor device as defined in claim 1, wherein said means for modulating produces a continuous wave amplitude modulation of said light produced by said light source.

7. The sensor device as defined in claim 1, wherein said means for modulating produces a pseudo-random binary modulation of said light produced by said light source.

* * * * *